(12) United States Patent
Mittal

(10) Patent No.: US 8,356,128 B2
(45) Date of Patent: Jan. 15, 2013

(54) METHOD AND SYSTEM OF REDUCING LATENCIES ASSOCIATED WITH RESOURCE ALLOCATION BY USING MULTIPLE ARBITERS

(75) Inventor: Aditya Mittal, Haryana (IN)

(73) Assignee: NVIDIA Corporation, Santa Clara, CA (US)

( * ) Notice: Subject to any disclaimer, the term of this patent is extended or adjusted under 35 U.S.C. 154(b) by 48 days.

(21) Appl. No.: 12/211,126

(22) Filed: Sep. 16, 2008

(65) Prior Publication Data

US 2010/0070667 A1    Mar. 18, 2010

(51) Int. Cl.
*G06F 13/14* (2006.01)

(52) U.S. Cl. .................... 710/242; 710/117

(58) Field of Classification Search .......... 710/306–315, 710/104–119, 22–28, 240–242
See application file for complete search history.

(56) References Cited

U.S. PATENT DOCUMENTS

| | | | |
|---|---|---|---|
| 5,455,913 A | 10/1995 | Shrock et al. | |
| 5,546,548 A * | 8/1996 | Chen et al. | 710/116 |
| 5,649,230 A | 7/1997 | Lentz | |
| 5,717,954 A | 2/1998 | Grieff et al. | |
| 5,761,468 A | 6/1998 | Emberson | |
| 5,768,548 A | 6/1998 | Young et al. | |
| 5,790,817 A | 8/1998 | Asghar et al. | |
| 5,822,568 A | 10/1998 | Swanstrom | |
| 5,864,876 A | 1/1999 | Rossum et al. | |
| 5,881,248 A | 3/1999 | Mergard | |
| 5,923,859 A * | 7/1999 | Melo et al. | 710/113 |
| 5,940,866 A | 8/1999 | Chisholm et al. | |
| 5,968,143 A | 10/1999 | Chisholm et al. | |
| 6,016,528 A | 1/2000 | Jaramillo et al. | |
| 6,018,803 A | 1/2000 | Kardach | |
| 6,029,223 A | 2/2000 | Klein | |
| 6,029,228 A | 2/2000 | Cai et al. | |
| 6,085,276 A * | 7/2000 | VanDoren et al. | 710/240 |
| 6,085,278 A | 7/2000 | Gates et al. | |
| 6,098,114 A | 8/2000 | McDonald et al. | |
| 6,101,568 A | 8/2000 | Richardson | |
| 6,157,980 A | 12/2000 | Arimilli et al. | |
| 6,175,634 B1 | 1/2001 | Graumann | |
| 6,182,112 B1 | 1/2001 | Malek et al. | |
| 6,185,634 B1 | 2/2001 | Wilcox | |
| 6,205,524 B1 | 3/2001 | Ng | |
| 6,226,695 B1 | 5/2001 | Kaiser et al. | |
| 6,233,656 B1 | 5/2001 | Jones et al. | |
| 6,266,742 B1 | 7/2001 | Challenger et al. | |
| 6,298,407 B1 | 10/2001 | Davis et al. | |
| 6,314,472 B1 | 11/2001 | Trieu et al. | |
| 6,345,341 B1 | 2/2002 | Arimilli et al. | |

(Continued)

OTHER PUBLICATIONS

"Battery Charging Specification", USB Implementation Forum Inc., Dated: Mar. 8, 2007, Pagesm1-29, Revision 1.0.

(Continued)

*Primary Examiner* — Raymond Phan

(57) ABSTRACT

A digital processing system employing multiple arbiters, all designed to allocate a resource to a same entity in response to a same condition. In an embodiment, the entities needing the resource may send a request to all the arbiters, and the specific entity to which the resource is allocated, receives indication of the allocation from a closest one of the arbiters. As a result, the latency in receipt of indication of allocation may be reduced. The features are described in the context of a bus as a resource.

20 Claims, 5 Drawing Sheets

U.S. PATENT DOCUMENTS

| | | | |
|---|---|---|---|
| 6,397,296 B1 | 5/2002 | Werner | |
| 6,418,496 B2 | 7/2002 | Pawlowski et al. | |
| 6,442,634 B2 | 8/2002 | Bronson et al. | |
| 6,480,939 B2 | 11/2002 | Anderson et al. | |
| 6,526,518 B1 | 2/2003 | Catlin et al. | |
| 6,560,657 B1 | 5/2003 | Gandhi et al. | |
| 6,571,318 B1 | 5/2003 | Sander et al. | |
| 6,574,712 B1 | 6/2003 | Kahle et al. | |
| 6,578,102 B1 | 6/2003 | Batchelor et al. | |
| 6,631,434 B1 | 10/2003 | Johnson et al. | |
| 6,681,281 B1 | 1/2004 | Maleck | |
| 6,681,285 B1 | 1/2004 | Ng | |
| 6,696,854 B2 | 2/2004 | Momtaz et al. | |
| 6,696,954 B2 | 2/2004 | Chung | |
| 6,745,258 B1 | 6/2004 | Pellegrino et al. | |
| 6,751,038 B1 | 6/2004 | Wada | |
| 6,754,755 B1 | 6/2004 | Johnson et al. | |
| 6,782,457 B2 | 8/2004 | Hill et al. | |
| 6,801,963 B2 | 10/2004 | Bissessur et al. | |
| 6,842,803 B2 | 1/2005 | Schmidt et al. | |
| 6,877,048 B2 | 4/2005 | Bilak et al. | |
| 6,898,649 B2 | 5/2005 | Goudie | |
| 6,901,467 B2 | 5/2005 | Shah et al. | |
| 6,904,473 B1 | 6/2005 | Bloxham et al. | |
| 6,907,480 B2 | 6/2005 | Takei et al. | |
| 6,910,106 B2 | 6/2005 | Sechrest et al. | |
| 6,915,363 B2 | 7/2005 | Wood et al. | |
| 6,950,892 B2 * | 9/2005 | Bell et al. | 710/120 |
| 6,957,290 B1 | 10/2005 | Rowlands et al. | |
| 6,996,684 B2 * | 2/2006 | Tseng et al. | 711/151 |
| 6,999,426 B2 | 2/2006 | Miyoshi | |
| 7,032,046 B2 * | 4/2006 | Horii et al. | 710/113 |
| 7,096,291 B2 * | 8/2006 | Lin | 710/241 |
| 7,124,232 B2 | 10/2006 | Takeda et al. | |
| 7,139,878 B2 | 11/2006 | Malik et al. | |
| 7,143,219 B1 | 11/2006 | Chaudhari et al. | |
| 7,177,985 B1 | 2/2007 | Diefendorff | |
| 7,263,566 B2 * | 8/2007 | Ganasan et al. | 710/118 |
| 7,376,846 B2 | 5/2008 | Hawkins et al. | |
| 7,389,466 B1 | 6/2008 | Harmer et al. | |
| 7,505,461 B2 | 3/2009 | Matsuda et al. | |
| 7,525,986 B2 | 4/2009 | Lee et al. | |
| 7,600,058 B1 | 10/2009 | Danilak | |
| 7,706,756 B2 * | 4/2010 | Sato et al. | 455/78 |
| 7,895,385 B2 | 2/2011 | Raju | |
| 2001/0001873 A1 | 5/2001 | Wickeraad et al. | |
| 2001/0014928 A1 | 8/2001 | Chrysos et al. | |
| 2002/0023204 A1 | 2/2002 | Barowski et al. | |
| 2002/0056027 A1 | 5/2002 | Kanai et al. | |
| 2002/0144054 A1 | 10/2002 | Fanning et al. | |
| 2003/0126355 A1 | 7/2003 | David | |
| 2003/0191880 A1 * | 10/2003 | Lin | 710/116 |
| 2003/0229743 A1 | 12/2003 | Brown | |
| 2003/0229762 A1 | 12/2003 | Maiyuran et al. | |
| 2004/0024947 A1 | 2/2004 | Barth et al. | |
| 2004/0024948 A1 | 2/2004 | Winkler et al. | |
| 2004/0049641 A1 | 3/2004 | So et al. | |
| 2004/0064649 A1 | 4/2004 | Volpe et al. | |
| 2004/0083341 A1 | 4/2004 | Robinson et al. | |
| 2004/0088458 A1 * | 5/2004 | Tomlinson et al. | 710/113 |
| 2004/0117606 A1 | 6/2004 | Wang et al. | |
| 2004/0123043 A1 | 6/2004 | Rotithor et al. | |
| 2004/0201647 A1 | 10/2004 | Jackson Pulver et al. | |
| 2005/0081014 A1 | 4/2005 | Tran et al. | |
| 2005/0138254 A1 * | 6/2005 | Raghavan et al. | 710/240 |
| 2005/0216607 A1 * | 9/2005 | Munguia | 710/15 |
| 2006/0041721 A1 | 2/2006 | Hakura et al. | |
| 2006/0041722 A1 | 2/2006 | Hakura et al. | |
| 2006/0041723 A1 | 2/2006 | Hakura et al. | |
| 2006/0095677 A1 | 5/2006 | Hakura et al. | |
| 2007/0198758 A1 * | 8/2007 | Asano et al. | 710/110 |
| 2009/0055566 A1 * | 2/2009 | Reinig et al. | 710/243 |
| 2009/0089477 A1 | 4/2009 | Reed | |
| 2009/0228631 A1 | 9/2009 | Marulkar et al. | |
| 2010/0057973 A1 | 3/2010 | Barake et al. | |

OTHER PUBLICATIONS

"Device Class Specification Adopters Agreement", Downloaded Circa: Mar. 10, 2007, pp. 1-5.

"Using Spin-Loops on Intel Pentium 4 Processor and Intel Xeon Processor". Version 2.1, May 2001. Order No. 248674-002. Retrieved from http://cache-www.intel.com/cd/00/00/01/76/17689_w_spinlock.pdf on Mar. 4, 2006.

Brandt, Scott, "Module 2: Computer—System Structure" Spring 2001, http://www/spe/icsc/edi/-sbrandt/courses/Spring01/111/slides/mod2.1.pdf.

Jason Fritts, "Multi-Level Memory Prefetching for Media and Stream Processing", Proceedings, 2002 IEEE International Conference on Multimedia and Expo, 2002. ICME'02. vol. 2, Aug. 26-29, 2002 Page(s): 101-104 vol. 2.

John Carter, et al., "Impulse: Building a Smarter Memory Controller". Proceedings, Fifth International Symposium on High-Performance Computer Architecture. Jan. 9-13, 1999, pp. 70-79.

Jouppi, N. P. "Improving direct-mapped cache performance by the addition of a small fully-associative cache and prefetch buffers", Proceedings. 17th Annual International Symposium on Computer Architecture, 1990. May 28-31, 1990, pp. 364-373.

* cited by examiner

METHOD AND SYSTEM OF REDUCING LATENCIES ASSOCIATED WITH RESOURCE ALLOCATION BY USING MULTIPLE ARBITERS

BACKGROUND

1. Field of Disclosure

The present invention relates to allocation of shared resources within a digital processing system and more specifically to arbitration based allocation of shared resources with reduced latencies.

2. Related Art

A shared resource refers to any resource (hardware, software and/or firmware based), which can be used by multiple entities. The usage of a resource generally depends on the type/nature of the resource. For example, a bus as a resource is used to transfer (send/receive) data between various components/entities of a digital processing system.

There is a general need to allocate a shared resource to some of the multiple entities that can share the resource. For example, there are several buses which are inherently designed to be used only by a single entity at any specific time instance and thus a bus may need to be allocated to one of the entities requiring to transfer data on the bus in each duration.

Arbitration is often used in allocation of shared resources, particularly when the number of resources is less than the number of entities that may need to use the resource. Arbitration generally entails determining the specific entities to which to allocate a resource according to a corresponding arbitration approach (e.g., fixed priorities, round robin, etc.).

A latency is generally present in arbitration based allocation of resources. Latency refers to a time delay measured, for example, between a time instance a request is made for a resource and communication is received of allocation of the same. There can be various components to the latency/delay such as, for example, the time taken to communicate that an entity requires a resource, time to allocate the resource based on an arbitration approach, and time taken to communicate the allocation.

It may be desirable in several instances to reduce the latency in arbitration based allocation of shared resources. Several aspects of the present invention provide for such reduction as described below with examples.

BRIEF DESCRIPTION OF THE DRAWINGS

The present invention will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A digital processing system provided according to an aspect of the present invention employs multiple arbiters, all designed to allocate a resource to a same entity in response to a same condition. Several advantages may be realized due to such an approach, depending on the environment in which the approach is employed.

In an embodiment, the entities needing the resource may send a request to all the arbiters, and the specific entity to whom the resource is allocated, receives indication of the allocation from a closest one of the arbiters. As a result, the latency in receipt of indication of allocation may be reduced. The embodiment is implemented to allocate a bus to one of several entities that can transfer data.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. Example Digital Processing System

Figure 1:
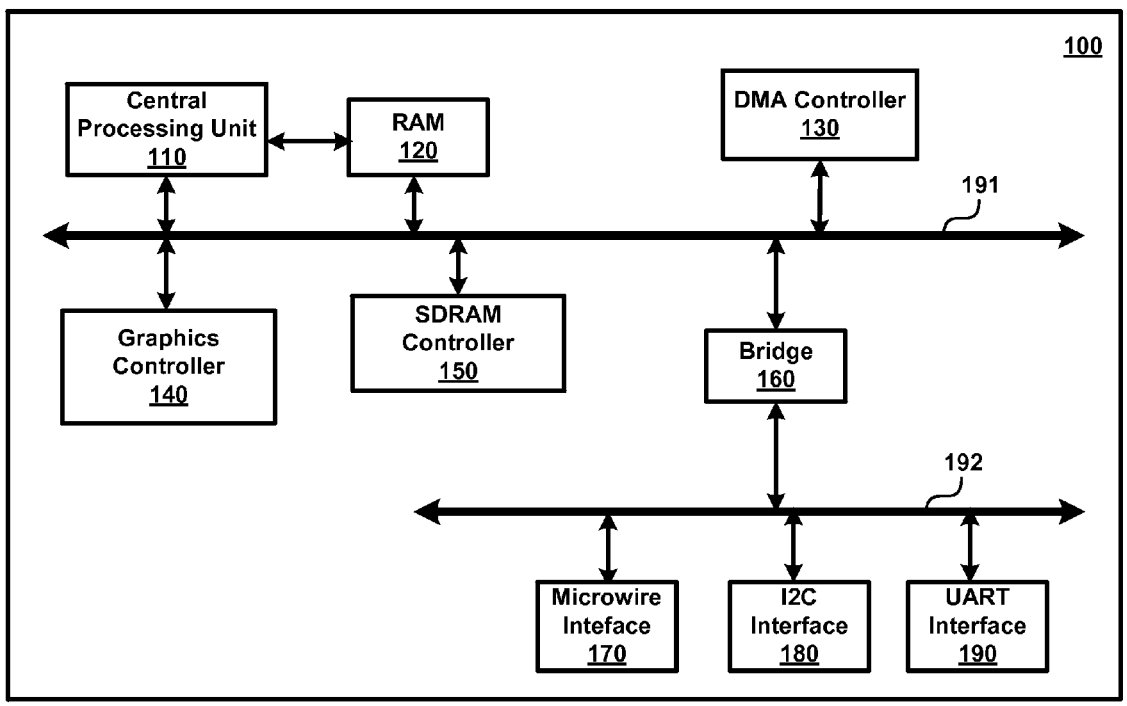
FIG. 1 is a block diagram of an example digital processing system in which several aspects of the present invention can be implemented.

FIG. 1 is a block diagram illustrating the details of an example digital processing system in which several aspects of the present invention can be implemented. The system is shown containing central processing unit (CPU) 110, random access memory (RAM) 120, DMA controller 130, graphics controller 140, SDRAM controller 150, bridge 160, microwire interface 170, I2C interface 180, UART interface 190 and buses 191/192. Each block is described in further detail below.

Bus 191 represents a resource used by various connected entities (CPU 110, graphics controller 140, bridge 160, etc.) to transfer data. These entities are also referred to as components of the digital processing system 100. In an embodiment, bus 191 operates according to a clock signal, with only one of the entities having the ability to transfer digital values in each clock cycle. The digital values can represent address information, data used by various applications (for example, executing on CPU 110) and control information (indicating what to do with the data being sent).

Bus 192 represents a peripheral bus connecting slow speed peripheral interfaces 170/180/190 via bridge 160. Each of the peripheral interfaces may in turn be connected to several peripheral devices (not shown). Bridge 160 permits transfer of digital values between the entities connected to bus 191 and the entities connected to bus 192.

CPU 110 executes the instructions stored in RAM 120 to implement various user applications. Data in RAM 120 (implemented, for example, as a static random access memory) or SDRAMs (not shown) accessible via SDRAM controller 150 may be used while executing the instructions.

Graphics controller 140 receives (on bus 191 from CPU 110) pixel values representing image frames and generates display signals to display the image frames on a display unit (not shown). DMA controller 130 operates to transfer bulk data (a sequence of data values) between memory (RAM or SDRAM) and various peripherals.

As noted above, bus 191 can be used by only one of the entities in any specific clock cycle. In an embodiment, an arbiter operates to allocate the bus to one of the entities and the allocated entity may send data a desired number of data values (possibly with a pre-specified upper limit to avoid starvation of other entities). The arbiter may allocate the bus to one of the entities requesting bus 191.

Several aspects of the present invention enable the bus to be allocated quickly. The features of the invention will be clearer in comparison with a prior approach and accordingly the prior approach is described next.

3. Prior Arbitration Approach

Figure 2:
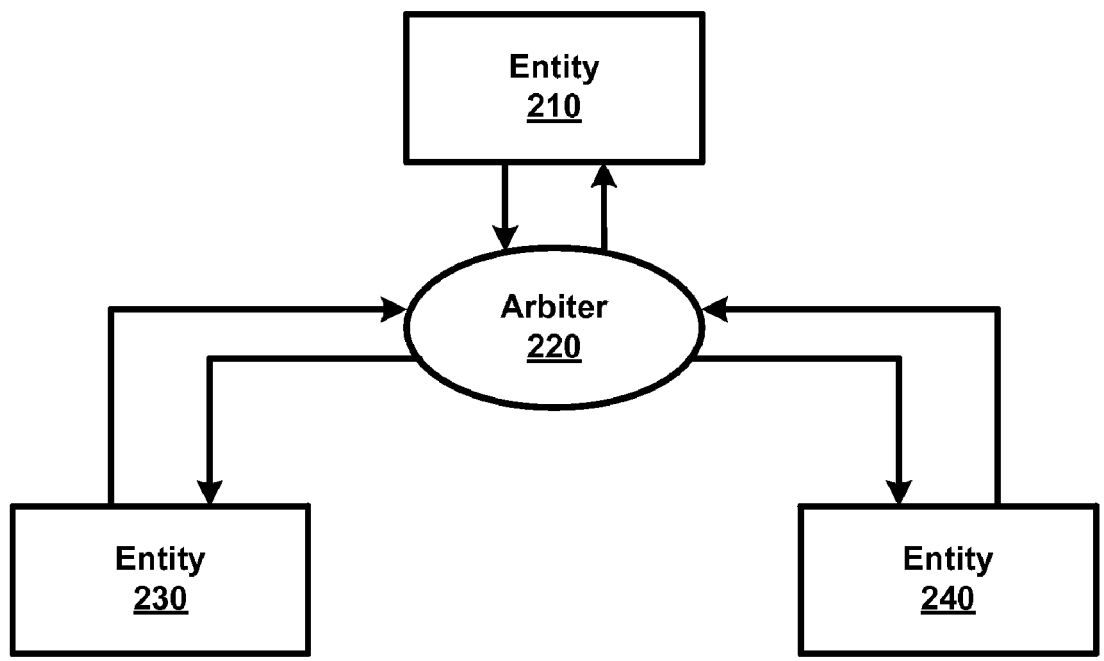
FIG. 2 is a block diagram illustrating the use of a prior arbiter.

FIG. 2 is a block diagram illustrating the manner in which a resource is allocated by an arbiter in a prior approach. There is shown a central arbiter 220 which receives requests from all of the entities which need to share a resource. Arbiter 220 determines the specific one of the entities 210/230/240 to which shared resource is to be allocated and communicates the same to the allocated entity. The allocated entity thereafter uses the resource for a duration according to a pre-specified convention (e.g., until all the required data is transferred, for a fixed number of clock cycles, etc.).

Thus, in the context of FIG. 1, arbiter 220 would be present in addition, and each of the entities 110/140/150/130, etc., would request arbiter 220 for allocation of bus 191. Arbiter 220 would then indicate the allocation to the specific allocated entity.

The central arbiter based approach of above may suffer from various deficiencies. For example, as the desired clock frequency in digital processing system 100 increases, it may become difficult to meet timing requirements due to factors such as layout/technology limitations at higher clock frequencies and larger die sizes (leading to longer routing paths between the arbiter and the entities). In particular, the latencies caused in the various paths may present challenges in meeting the various timing requirements.

As an illustration assuming that the clock period equals 3 nano seconds, and the length of the longest communication path to send a request and receive grant is 5 mm, a delay of approximately 2.5 nano seconds may be encountered. Assuming that arbiter further consumes 1 nano second delay, the total duration to receive a grant would equal about 3.5 nano seconds, which is more that one clock cycle (3 ns). It may be desirable to receive the grant indication in the same clock cycle.

Various aspects of the present invention overcome one or more of the deficiencies noted above.

4. Arbitration Approach with Reduced Latency

Figure 3:
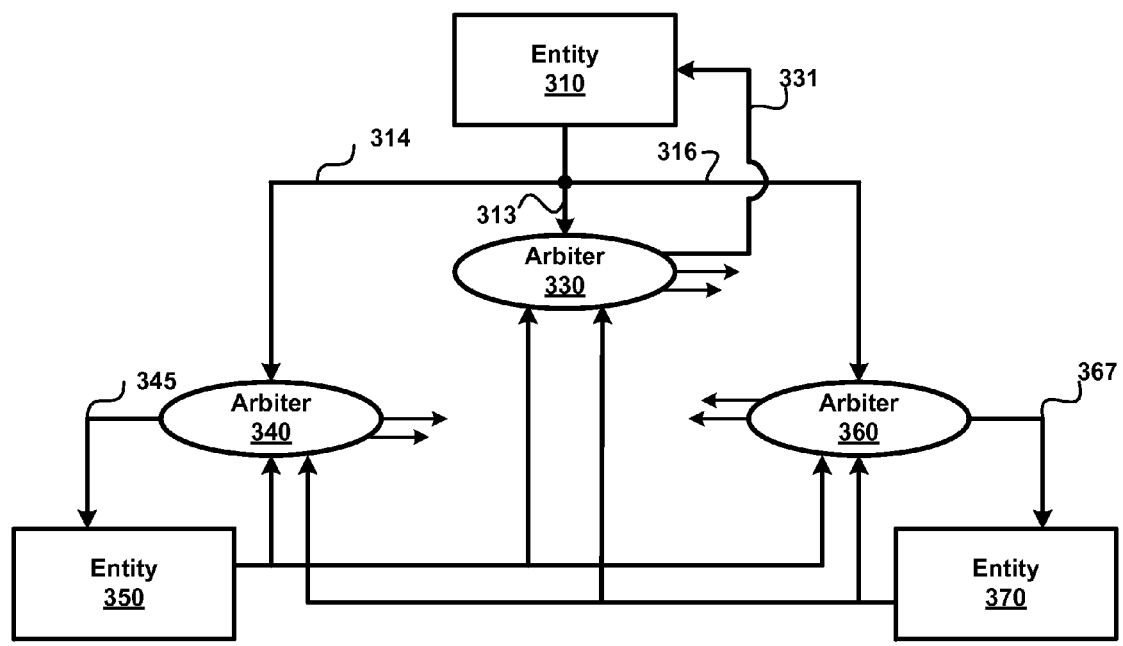
FIG. 3 is a block diagram illustrating arbitration based allocation of a shared resource according to an aspect of the present invention.

FIG. 3 is a block diagram illustrating the manner in which latency is reduced in allocation of a resource according to an aspect of the present invention. As shown there, multiple arbiters 330, 340 and 360 are employed. The location of each arbiter may be chosen such that the distance between an entity and the corresponding closest arbiter does not exceed a pre-specified distance (or the propagation/static type delays are within acceptable parameters).

Each of the arbiters receives same requests from all of the entities. In other words, each entity requests all the arbiters for the resource. Thus, entity 310 is shown sending the same request on paths 313, 314, and 316 to arbiters 330, 340 and 360 respectively. Paths 313, 314 and 316 may be implemented as a single path connecting to all the arbiters, as also logically represented by the Figure.

All the arbiters are designed to grant the resource to the same requester according to an allocation approach. For example, assuming the allocation approach to be based on a hierarchical priority (implying that an entity with the highest pre-specified priority is entitled to allocation of the resource), all the arbiters may be designed to allocate the resource to the entity with the highest priority.

However, the closest arbiter is designed to communicate the grant of the shared resource to the allocated entity. In the illustrative example of FIG. 3, arbiters 330, 340 and 360 are respectively assumed to be closest (in terms of the routing path) to entities 310, 350 and 370. Thus, each entity is shown receiving allocation indication from only the closest arbiter.

Accordingly, entity 310 is shown receiving allocation indication on path 331. Similarly, entities 350 and 370 are shown receiving respective grants from arbiters 340 and 360 (on paths 345 and 367) respectively. It may be appreciated that the grant determinations to non-closest entities need not be communicated (or left unused) as represented by absence of connection of paths from arbiter 330 to entities 350/370, from arbiter 360 to entities 310/350, etc.

From the above approach, it may be appreciated that the latency in communicating back allocation of the resource is reduced due to the use of multiple arbiters, the physical placement of the arbiters, and the communication of grant from the closest arbiter. Accordingly, it may be easier to meet the various timing requirements noted above.

The approach of FIG. 3 can be employed in several environments. The manner in which the approach can be applied to digital processing system 100 is described below in further detail for illustration.

5. Allocation of Bus with Reduced Latency

Figure 4:
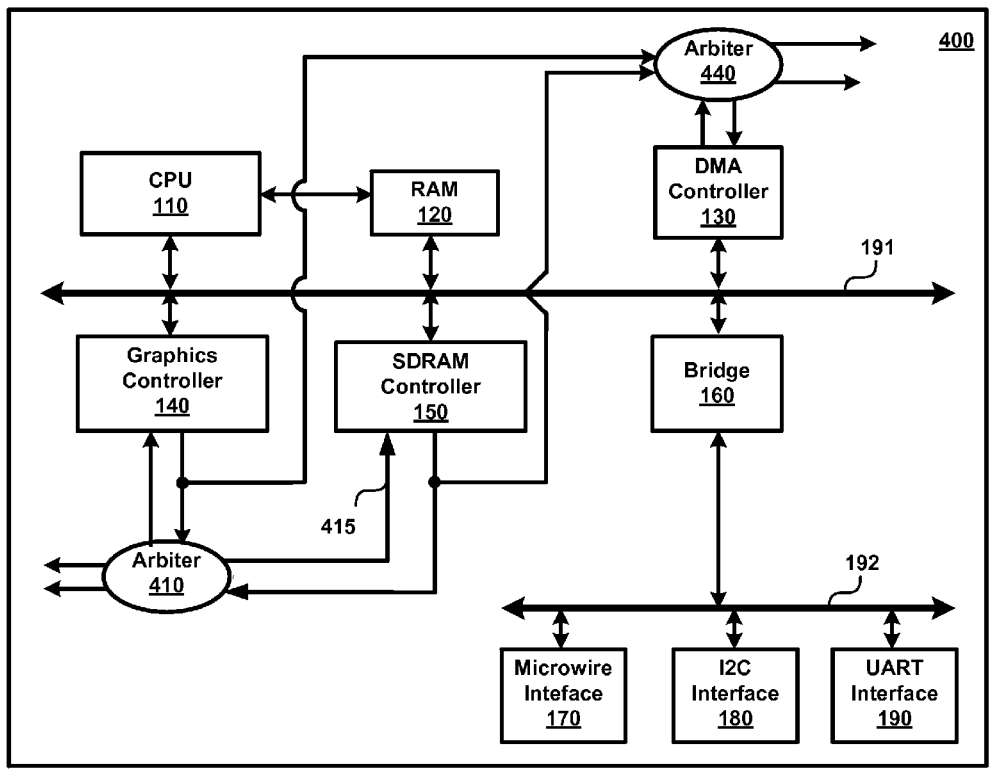
FIG. 4 is a block diagram illustrating the manner in which arbitration based allocation is implemented according to an aspect of the present invention in a digital processing system.

FIG. 4 is a block diagram illustrating the manner in which bus allocation is performed with reduced latency in an embodiment of the present invention. Various components of FIG. 1 are repeated in FIG. 4 for ease of understanding and the description is not repeated for conciseness. Only the differences are described below.

As shown there, only two arbiters 410 and 440 are shown employed, each placed in different portions. However, more arbiters can be used, as suitable in the specific environment (particularly those requiring long communication path due to factors such as die size, complex routing, etc.).

Also, merely to avoid obfuscating FIG. 4, the connections from only some of the entities to the two arbiters are shown. However, similar connections may need to be present from the remaining entities (e.g., CPU 110, bridge 160, etc., to both arbiters 440 and 410) that need to send data on bus 191 (assuming the sender has to request the resource).

Thus, arbiter 410 is shown connected to receive requests from entities 140 and 150, and arbiters 440 is shown connected to receive requests from entities 130 and 150, though each of the arbiters would receive connected to receive the requests from all entities 110, 120, 130, 140, 150 and 160 sharing bus 191.

However, each entity would receive grant indication from the closest arbiter. Thus, arbiter 410 is shown providing grant indication to graphics controller 140 and SDRAM controller 150, while arbiter 440 is shown providing grant indication to DMA controller 130.

As a result, both DMA controller 130 and graphics controller 140 may receive respective grant indications with reduced latency, though they are located in different parts of the system/die.

Thus, in operation, each of the specific entities 130, 140 and 150 may assert respective lines to send request to each of arbiters 410 and 440. Both arbiters determine the same entity as entitled to the bus.

However, only one of the arbiters may communicate the grant request to the allocated entity. Assuming both the arbiters 410/440 allocate bus 191 to SDRAM controller 150, arbiter 410 may assert line 415 to indicate the grant.

Once bus 191 is granted, SDRAM controller 150 may transfer data on bus 191. Due to the approach thus implemented, the arbitration based allocation may be completed in a single clock cycle.

For example assuming a clock period of 3 nano seconds and a total communication path of approximately 2.5 mm (reduced in comparison to the example noted above), the delay on the communication paths equals 1.25 nano seconds. Assuming further that each arbiter requires 1 nano second to make a grant decision, it may be appreciated that the total time to receive a grant would equal 2.25 nano seconds, less than the clock period.

It may be generally asserted that the need for the features of the present invention is more as the clock period reduces (or frequency of the clock signal is enhanced). The operation of an embodiment is illustrated below with respect to a timing diagram.

6. Timing Diagram

Figure 5:
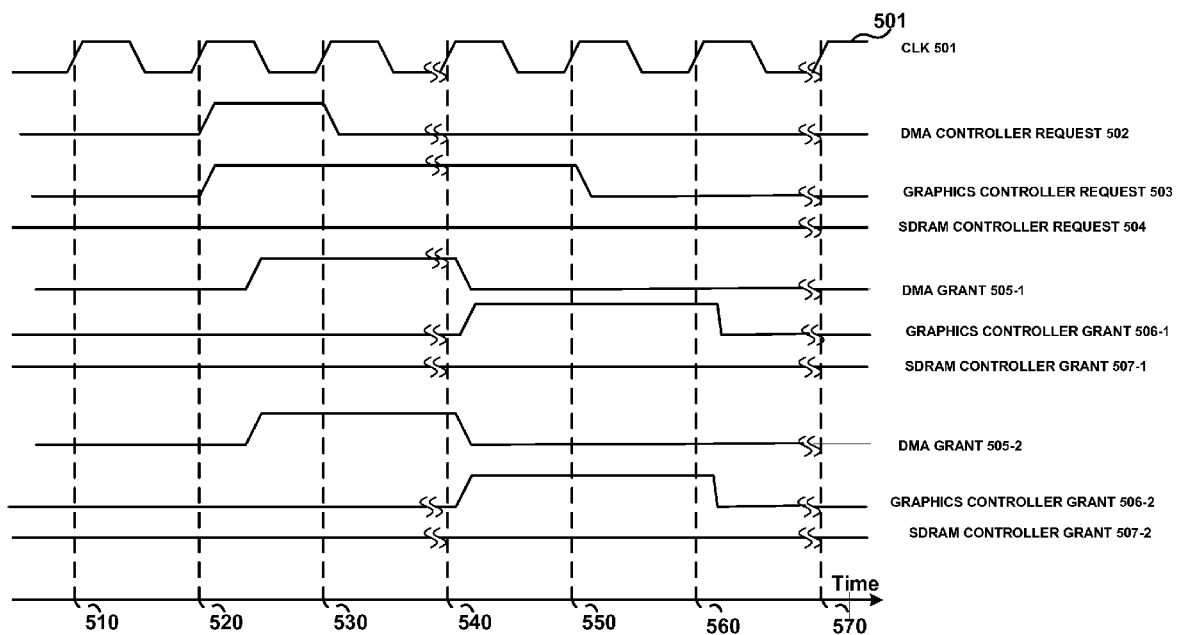
FIG. 5 is a timing diagram illustrating arbitration based allocation of resources in an embodiment of the present invention.

FIG. 5 is a timing diagram illustrating single cycle allocation of a resource in an embodiment. It may be readily observed that the diagram is provided assuming two arbiters 410 and 440, and with each arbiter generating the grant signal to respective entity and thus two sets of grant signals (3 signals each) are shown. Both sets of grant signals would be operated similarly (since the same entity is granted the resource under the same condition) and thus the grant signals to the same entity may be viewed as being substantially identical (except that there may be propagation delay lags, as received at the respective entity). A logical OR may be performed of the received grant signals and the output of the OR gate may be used by the entity (thereby ensuring that the earliest of the received grants is used by the entity). Alternatively, the grant signal of only the nearest arbiter may be used, as described in the previous sections, even though all arbiters may generate all grant signals.

Further, for conciseness, it is assumed that only 3 entities 130/140/150 are requesting the resource. The operation at relevant ones of the time instances 510, 520, 530, 540, 550, 560 and 570 is described below.

The timing diagram depicts that DMA controller 130 and graphics controller 140 are shown requesting bus 191 by respective signals 502 and 503, at time instance 520. Each signal 502/503 represents the request being sent to both arbiters 410 and 440. SDRAM controller is shown not requesting the bus at time instance 520.

Assuming that DMA controller 130 has a higher priority than graphics controller 140, both arbiters 410/440 determine that bus 191 is to be allocated to DMA controller 130. Thus DMA grant signals 505-1 and 505-2 are shown asserted ahead of time instance 530 (the rising edge following that at time instance 520). It is noted that grant signals 506 (to graphics controller 140) and 507 (to SDRAM controller 150) are not asserted at time instance 530, indicating a grant to only one entity.

It may be appreciated that DMA controller 130 sends grant request at the rising edge (520) of one clock signal and receives the grant indication at the rising edge (530) of the immediately following clock signal. Thus, the grant is received within a single clock cycle if the requesting entity is entitled to the bus (i.e., bus is available for use and the requesting entity has the right priority).

Assuming DMA controller 130 has completed using bus 191 after time instance 540, and that graphics controller 140 continues assertion of request line 503 up to that time instance (and no other higher priority entities are requesting bus 191), the grant indication to graphics controller 140 is shown deasserted on signal 506 by time instance 550.

Thus, using the approaches described above, the latency in arbitration based allocation of shared resources may be reduced. In the case of clock based systems, the allocation grant may be received in a single clock cycle.

7. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A digital processing system comprising:
   a plurality of electronic components;
   an electronic resource is operable to be used exclusively by one of said plurality of electronic components at a given time; and
   a plurality of arbiters, wherein each of said plurality of arbiters is operable to allocate said electronic resource to a same electronic component in response to a same condition.

2. The digital processing system of claim 1, wherein each of said plurality of electronic components is operable to send a request to all of said plurality of arbiters to access said electronic resource.

3. The digital processing system of claim 1, further comprising:
   a plurality of response lines, wherein each electronic component of said plurality of electronic components is coupled to a closest arbiter of said plurality of arbiters via an associated response line of said plurality of response lines, and wherein a closest arbiter of said plurality of arbiters is operable to communicate allocation of said electronic resource to an electronic component via said associated response line.

4. The digital processing system of claim 1, further comprising:
   a plurality of request lines associated with each electronic component of said plurality of electronic components, wherein said plurality of request lines is operable to communicate access request by an electronic component to said plurality of arbiters.

5. The digital processing system of claim 1, further comprising:
   a clock generator operable to generate a clock signal comprising clock cycles, wherein one of said plurality of arbiters is operable to communicate allocation of said electronic resource to an electronic component requesting access to said electronic resource within one clock cycle of said clock signal from said request.

6. The digital processing system of claim 5, wherein a period of said clock signal is less than or equal to 3 nano seconds.

7. The digital processing system of claim 1, wherein said electronic resource is a bus, and wherein said plurality of electronic components comprises a bridge, a processor and a direct memory access (DMA) controller.

8. The digital processing system of claim 7, wherein said processor is a single central processing unit (CPU), and wherein said plurality of arbiters is positioned external to said single CPU.

9. A digital processing system comprising:
   a plurality of electronic components;
   a first bus operating according to a clock signal comprising a plurality of clock cycles, wherein said first bus is operable to be used exclusively by one of said plurality of electronic components at any given time; and
   a plurality of arbiters, wherein each arbiter of said plurality of arbiters is operable to allocate said first bus to a specific electronic component for a subset of said plurality of clock cycles, wherein said allocation is responsive to a plurality of conditions.

10. The digital processing system of claim 9, wherein said specific electronic component is operable to transmit a request to access said first bus to said plurality of arbiters.

11. The digital processing system of claim 9, further comprising:
   a central processing unit (CPU) coupled to said first bus, wherein said CPU is one of said plurality of electronic components;
   a second bus operating at a lower speed compared to said first bus;
   a peripheral interface coupled to said second bus; and
   a bridge coupling said first bus to said second bus, wherein said bridge is one electronic component of said plurality of electronic components.

12. The digital processing system of claim 9, wherein said plurality of electronic components comprises a graphics controller coupled to said first bus.

13. The digital processing system of claim 9, wherein a period of said first clock signal is less than or equal to 3 nano seconds.

14. The digital processing system of claim 9, wherein an arbiter that is positioned closest to said specific electronic component in comparison to other arbiters of said plurality of arbiters communicates allocation of said first bus to said specific electronic.

15. A method of allocating a shared electronic resource to a first electronic component, said method comprising:
   receiving at each of a plurality of arbiters a request to access said shared electronic resource, wherein said request is initiated by said first electronic component, and wherein said first electronic component is operable to exclusively access said shared electronic resource when said request is granted;
   each of said plurality of arbiters independently determining that access to said shared electronic resource is to be granted to said first electronic component; and
   communicating exclusive allocation of said shared electronic resource to said first electronic component, wherein said communicating is performed by an arbiter that is positioned closest to said first electronic component in comparison to other arbiters of said plurality of arbiters.

16. The method of claim 15, wherein said shared electronic resource is a bus.

17. The method of claim 15, wherein said first electronic component is operable to receive a message associated with said communicating within one clock period of transmitting said request to access said shared electronic resource.

18. The method as described by claim 15 further comprising:
   prior to said determining, receiving at each of said plurality of arbiters a request to access said shared electronic resource from a second electronic component, wherein said second electronic component is operable to exclusively access said shared electronic resource when said request is granted.

19. The method of claim 17, wherein said clock period is less than or equal to 3 nano seconds.

20. The method as described by claim 18, wherein an arbiter that is positioned closest to said second electronic component in comparison to other arbiters of said plurality of arbiters communicates exclusive allocation of said shared electronic resource when request by said second electronic component is granted.

* * * * *